C. M. CULP.
CUSHION TIRE.
APPLICATION FILED MAR. 15, 1912.

1,076,024.

Patented Oct. 21, 1913.

Witnesses:
L. W. Cook.
R. F. Snoke.

Charles M. Culp.
Inventor.
By George J. Ottsch.
Attorney.

UNITED STATES PATENT OFFICE.

CHARLES M. CULP, OF SOUTH BEND, INDIANA.

CUSHION-TIRE.

1,076,024.

Specification of Letters Patent.

Patented Oct. 21, 1913.

Application filed March 15, 1912. Serial No. 683,919.

*To all whom it may concern:*

Be it known that I, CHARLES M. CULP, a citizen of the United States, residing at South Bend, in the county of St. Joseph and State of Indiana, have invented certain new and useful Improvements in Cushion-Tires, of which the following is a specification.

My invention relates to cushion tires for automobile and other vehicles.

One object of the present invention is to provide a vehicle tire which will absorb vibration and shock due to running over rough and uneven roads and obstructions.

A further object of the invention resides in the provision of a cushion tire having a plurality of buffer members disposed peripherally of and supporting the tread of the wheel, said buffers forming air chambers from which the air is forced when under abnormal pressure, and which assume their normal contour under normal load or pressure.

A still further object of the invention resides in the provision of a cushion tire, the tread of which is supported by a plurality of buffer members yielding under abnormal pressure, and forming air chambers from which the air can be but gradually expelled when subjected to abnormal pressure, thus gradually taking up shock.

A still further object of the invention resides in the provision of a cushion tire, provided with a plurality of buffer members forming air chambers for supporting the tread, which buffers are designed to withstand collapse under normal pressure, and which are compressible under abnormal pressure, the buffers automatically assuming their normal contour when relieved of excess pressure and drawing air within their chambers, which air can be expelled but gradually upon collapse of the buffer, thus affording an air cushion tire not requiring mechanical inflation.

With these and other objects in view, the invention consists of certain novel features of construction and combination of parts, as hereinafter more fully described and pointed out in the claims.

Figure 1:
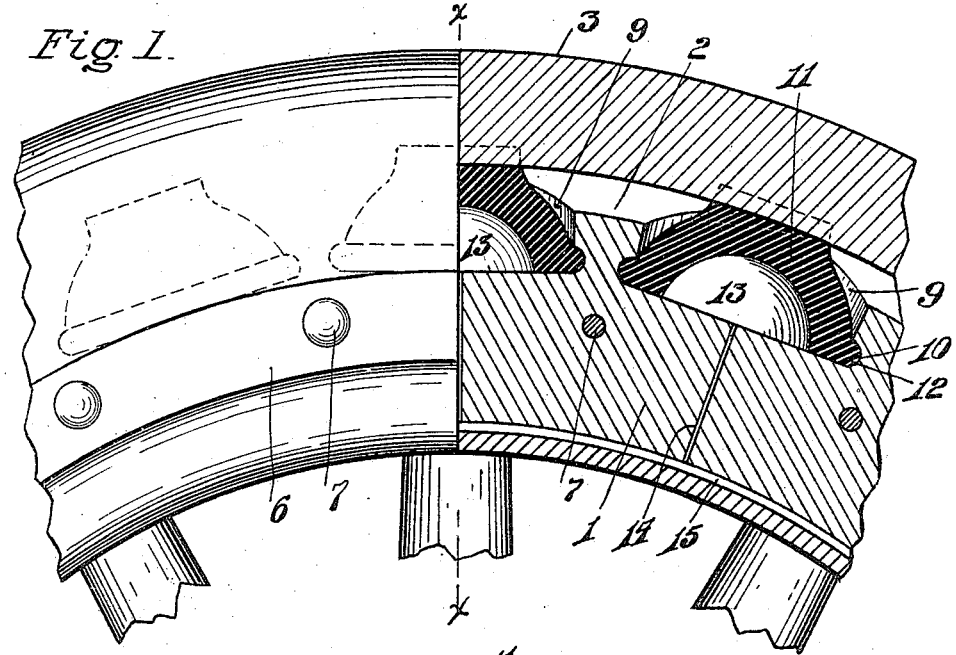
Figure 2:
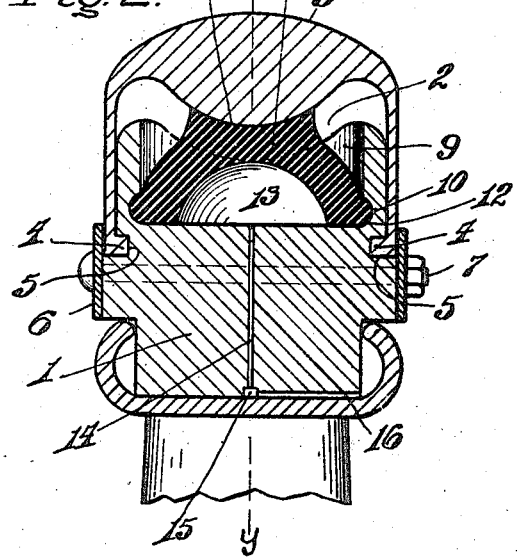

In the drawing employed for illustrating the preferred embodiment of my invention: Figure 1 is a fragmentary view of the tire partly in elevation, and partly in section taken on the line Y—Y of Fig. 2. Fig. 2 is a cross-sectional view thereof taken on the line X—X of Fig. 1.

Referring now more particularly to the accompanying drawing, the reference character 1 represents the base of the tire, which is preferably made of wood having a tough fiber, for the purpose of obtaining both strength and lightness of construction. This base is provided with a concaved outer face 2, which forms a seat for a rubber tread member 3, the sides of which fold over the sides of the base and flange members 4 thereof enter grooves 5 formed in the opposite sides of the base. Clamping plates 6, which are secured to the base by means of bolts 7, extend over the flange portions of the tread when in position upon the base. The inner portion of the base members may be reduced, as shown in Fig. 2, so as to fit a clencher rim, and the tire may be made up in sections, so as to permit same to be readily applied to a clencher rim of the structure shown, the form of rim, or whether making up the tire in sections or not, being optional and immaterial for the purpose of the present invention.

The base is provided on its outer face with a plurality of closely spaced sockets 9, preferably circular in form, and having annular grooves 10 formed in the side walls thereof adjacent the bottom of the socket. Buffer members 11, preferably made of solid rubber and of considerable thickness so as to withstand great pressure without collapsing, are seated in said sockets, ribs 12 on the buffers being forced into the annular grooves 10 to prevent displacement thereof. Each buffer is formed with a semi-spherical cavity 13, forming an air chamber into which air is admitted through the ducts 14, 15 and 16 in communication with each other, the air ducts 14 being sufficiently small so that, upon compression of the buffers due to excess pressure thereon, the air can escape but gradually, thus gradually taking up shock due to traveling over rough and uneven roads, or passing over obstructions. The buffers are intended to serve their purpose only in the event of abnormal or excess pressure upon the tire, serving as an auxiliary rather than a primary cushioning means for the tread, the latter having a double convex formation, and very thick at its center point, so that it, the same being of rubber, will take up or absorb ordinary shock. The tread is normally held spaced from the base and is seated in the concaved ends 17 of the buffers, and the inner concaved surface of the tread becomes seated in the concaved periphery of the base when the tread is completely depressed, thus allowing the tread to still have a cushioning effect, although the buffers may be compressed to their limit.

By removing one of the clamping plates 6 on either side of the tire the tread may be detached and raised along one of its edges and access had to the buffers for the purpose of replacement, the manner of mounting and holding the same permitting their easy removal and replacement, so that repairs may be readily and quickly made.

I have thus provided a vehicle tire employing air as a cushioning means, and in which the air-confining units are of a structure which does not result in throwing the tire out of commission in case of injury or the wearing out of one or more of such units, and in which air is used for cushioning purposes without requiring mechanical means for inflation purposes, or confining air under pressure.

Having thus described my invention, what is claimed is:—

1. A vehicle tire comprising a base portion, sockets formed in spaced relation around the periphery of said base, buffers seated in said sockets and extending normally beyond the periphery of said base, a tread portion seated upon said buffers, the latter being hollow and forming air chambers in connection with the base when seated in their sockets, and air ducts communicating with said chambers to permit ingress and egress of air to and from said chambers.

2. A vehicle tire comprising a base portion having a plurality of sockets formed in its outer face, air ducts in communication with the bottom of said sockets, yielding buffers hollowed on one side and adapted to be seated in said sockets with their hollow portions covering said air duct openings, the bottom of the sockets and buffers combined forming air chambers, and a tread portion seated upon the outer ends of said buffers and held spaced from the base portion, said buffers being entirely collapsible within their sockets when under excess pressure.

In testimony whereof I affix my signature in presence of two witnesses.

CHARLES M. CULP.

Witnesses:
 DAN PYLE,
 LELA COOK.